C. F. JENKINS.
MOTION PICTURE MACHINE.
APPLICATION FILED MAR. 20, 1913.

1,225,636.

Patented May 8, 1917.

Witnesses
Edwin L. Bradford
Robert Craig Greene

Inventor
C. F. Jenkins
By Wallace Greene
Attorney

UNITED STATES PATENT OFFICE.

CHARLES FRANCIS JENKINS, OF WASHINGTON, DISTRICT OF COLUMBIA.

MOTION-PICTURE MACHINE.

1,225,636.   Specification of Letters Patent.   Patented May 8, 1917.

Application filed March 20, 1913. Serial No. 755,752.

*To all whom it may concern:*

Be it known that I, CHARLES FRANCIS JENKINS, a citizen of the United States, residing at Washington, in the District of Columbia, have invented certain new and useful Improvements in Motion-Picture Machines, of which the following is a specification, reference being had therein to the accompanying drawing.

Municipal regulations in perhaps most places now require motion picture projecting apparatus to be operated in the interior of a fireproof chamber or cabinet because experience has shown it practically impossible to use ordinary apparatus without great danger of ignition, and because the burning of a large film roll produces intense heat, while it is impossible to extinguish the fire until the entire film roll is consumed. These facts have prevented and still prevent the free use of simple projecting apparatus in homes, schools, churches, and the like.

The object of this invention is to lessen the dangers indicated, and particularly to make ignition of the film far less probable, since by this step coupled with others, not here set forth, I have produced simple projecting apparatus which will not ignite the film even though the film feed cease for any interval while the light remains directly upon the film.

In the accompanying drawings.

Figure 1:
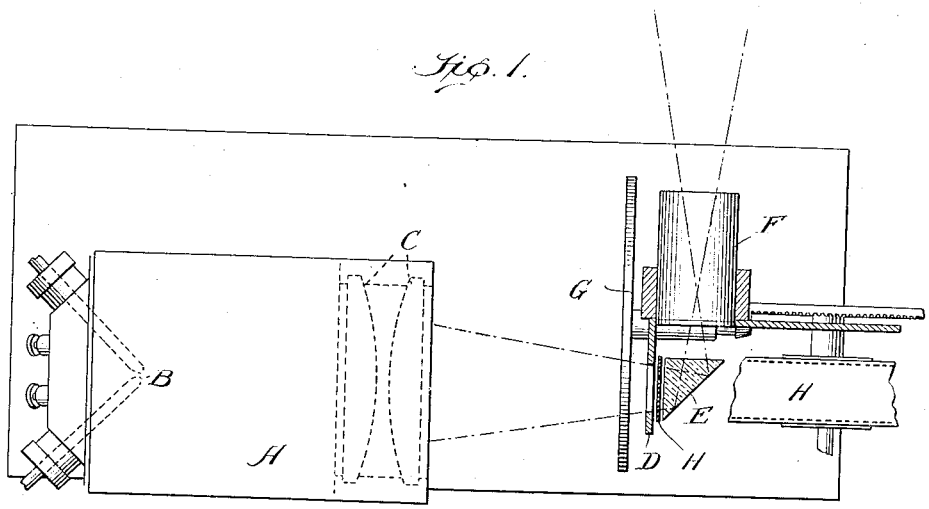
Figure 1 is a plan view of my apparatus.
Figure 2:
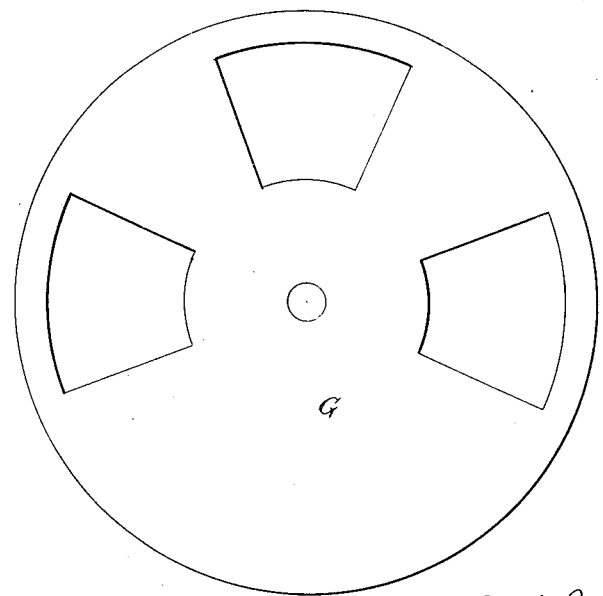
Fig. 2 is a side view of a shutter of standard construction.

In these figures, A represents a casing containing a small light B and a condensing lens C, D a frame plate provided with the usual aperture across which the film is passed step by step, E a prism deflecting the light coming through the aperture through a projecting lens F to any screen or the like (not shown) and away from the film rolls. G represents a shutter interposed between the source of light and the apertured plate and film exposed at the aperture and rotated at the proper speed by any suitable means.

The usual shutter of this class is so cut away as to allow only about forty per cent. of the light falling upon it to pass to the film and thence to the screen. Since the film and screen are without light about sixty per cent. of the time, a powerful light is required, and as heat increases with the light and the shutter is usually interposed in the path of the beam passing from the film to the screen, this powerful light and the strong heat rays fall continuously upon the film, with the result that stopping of the film, even for a very short interval, causes it to be ignited, especially since the apertured plate and the film guide at the aperture gradually accumulate heat and necessarily reach a somewhat high temperature. I avoid much of the difficulty by placing the shutter between the light source and the film and at some distance from the latter. By this means alone about sixty per cent. of the heat is intercepted and never reaches the film, and at the same time the parts about the film are prevented from becoming hot. The thin portion of the shutter receiving all this intercepted heat is well adapted to radiate it since it rotates in free air.

What I claim is:

1. The combination with a source of light and means for properly presenting the film in the path of the light at a certain point, of a moving apertured shutter located in free cooling air and in the path of the light from its source to said point.

2. The combination with a light, a condensing lens, and a plate having an exposure aperture, of a rotary shutter interposed between said lens and exposure aperture and forming the sole means of interrupting a light beam passing from said lens to said aperture, said plate and shutter being located in free cooling air.

In testimony whereof I affix my signature in presence of two witnesses.

CHARLES FRANCIS JENKINS.

Witnesses:
   J. R. WHITE,
   JAMES L. CRAWFORD.